Nov. 8, 1955  E. A. JENSEN ET AL  2,722,824
APPARATUS FOR TESTING ANTIFRICTION BEARINGS
Filed Oct. 24, 1951  3 Sheets-Sheet 1

INVENTORS.
Evan A. Jensen &
Robert J. Davies
BY
Hiins, Olson & Mecklenburger
Kitty S.

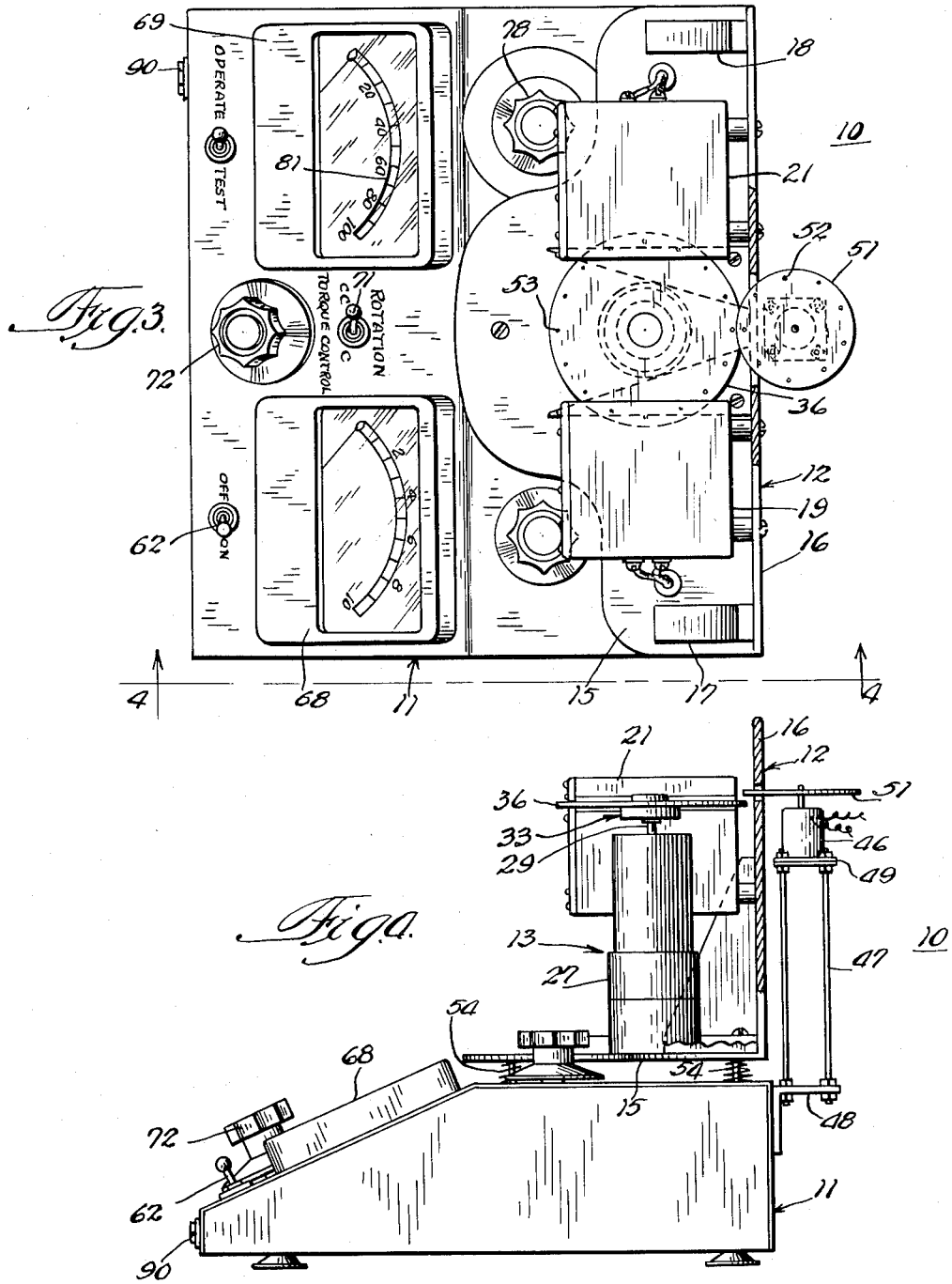

Nov. 8, 1955  E. A. JENSEN ET AL  2,722,824
APPARATUS FOR TESTING ANTIFRICTION BEARINGS
Filed Oct. 24, 1951  3 Sheets-Sheet 3
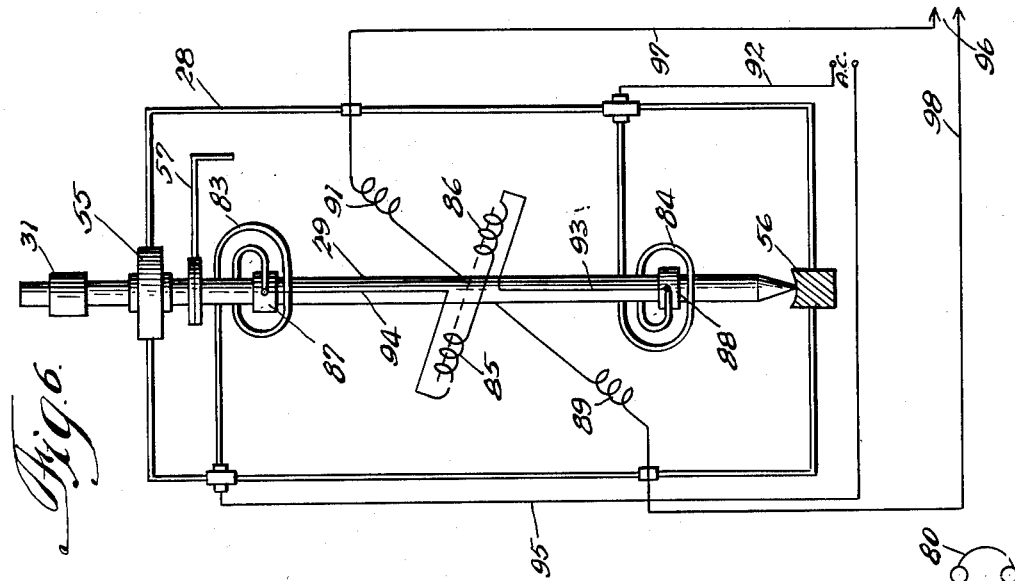
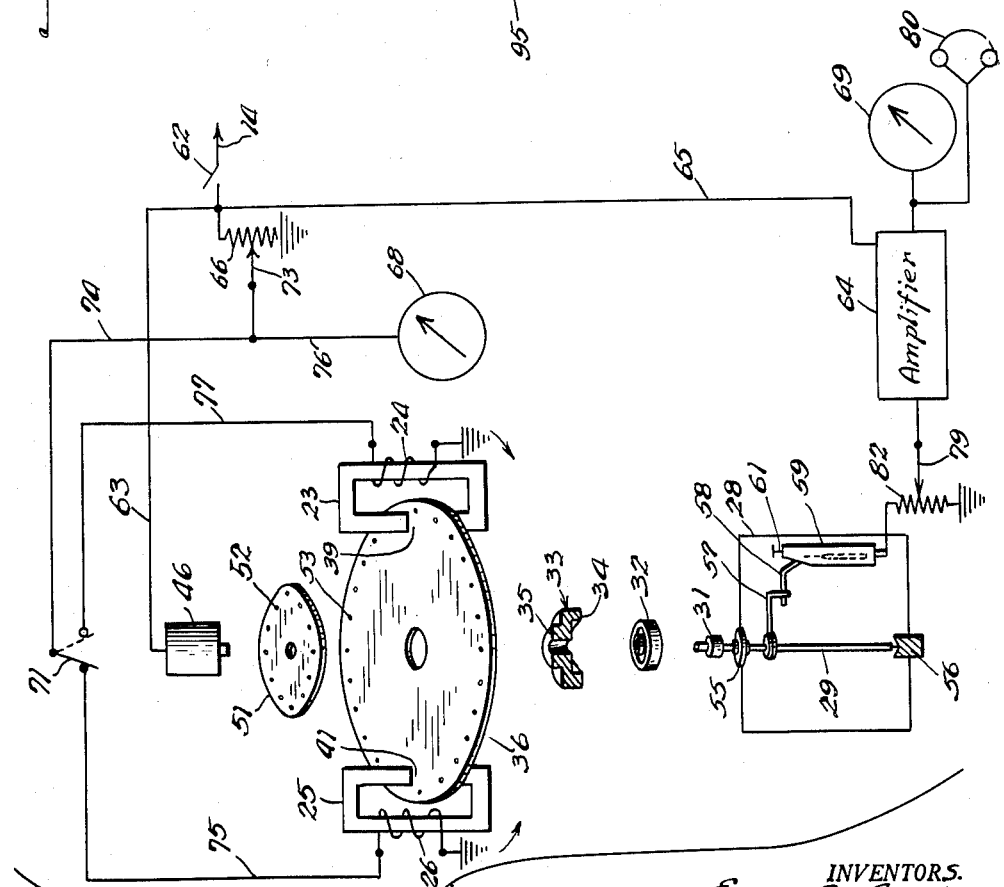
INVENTORS.
Evan A. Jensen &
Robert J. Davies
BY
Thiess, Olson & Mecklenburger
Attys

United States Patent Office 2,722,824
Patented Nov. 8, 1955

2,722,824

APPARATUS FOR TESTING ANTIFRICTION BEARINGS

Evan A. Jensen, San Carlos, and Robert J. Davies, San Mateo, Calif., assignors to United Air Lines, Inc., Chicago, Ill., a corporation of Delaware Application October 24, 1951, Serial No. 252,884

14 Claims. (Cl. 73—9)

This invention relates to apparatus for testing antifriction bearings, more particularly to apparatus for testing sensitive instrument bearings, and it is an object of the invention to provide improved apparatus of this character.

Heretofore the acceptance or rejection of sensitive instrument bearings has been determined largely by the judgment of the skilled operator who handled them. At best such judgment could provide only bearings which were satisfactory and ones which were not. It could not provide a positive indication of a bearing condition, such as the number of gram-centimeters of torque required to overcome the bearing friction. Accordingly, it is a further object of the invention to provide an improved antifriction bearing tester of the character indicated which will provide a positive indication of the starting torque, running torque, and instantaneous peak or transient torque.

It is a further object of the invention to provide an improved antifriction bearing tester of the character indicated which is simple and rapid to operate and accurate in indication.

In carrying out the invention in one form, apparatus for testing antifriction bearings is provided comprising: first means for receiving and gripping one race of such a bearing, second means for receiving and gripping the other race of such bearing, electrical means for rotating one of the first and second means, and means including piezoelectric means for restraining rotative movement of the other of the first and second means and detecting instantaneous changes in the torque necessary for such restraint.

For a more complete understanding of the invention reference should be had to the accompanying drawings, in which:

Fig. 3 is a top plan view, partially broken away, of the apparatus shown in Fig. 1;

Fig. 4 is a side elevational view, partially broken away, taken substantially in the direction of the arrows 4—4 of Fig. 3;

Fig. 5 is an exploded diagrammatic view and circuit diagram of apparatus embodying the invention; and Fig. 6 is a schematic view on an enlarged scale of another embodiment of one component of apparatus shown in the preceding figures.

Figures 1, 2:
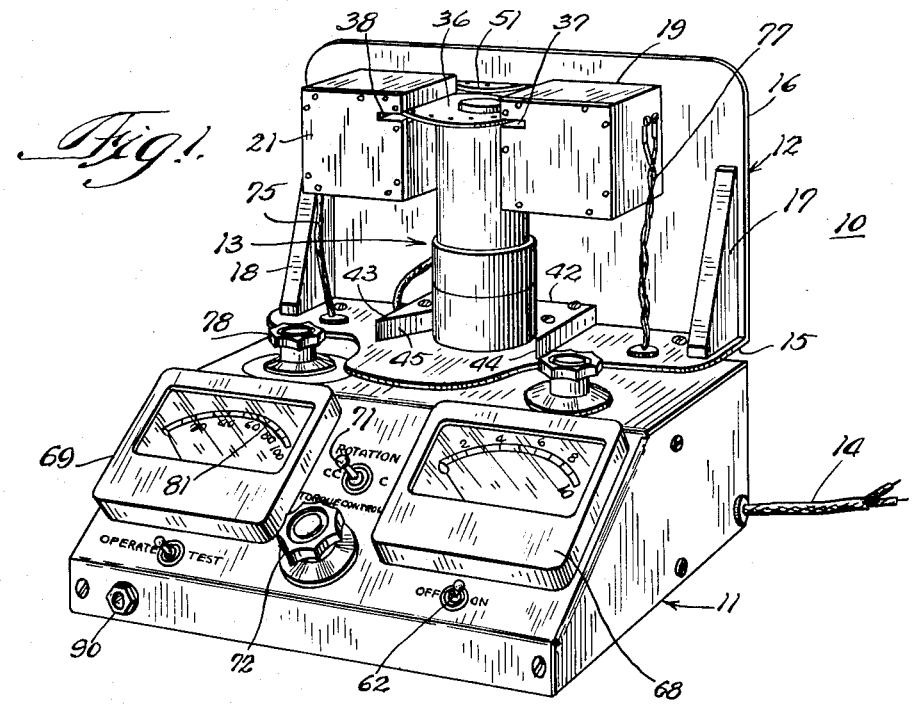
Fig. 1 is a perspective view of apparatus embodying the invention.
Fig. 2 is a partially exploded perspective view of the apparatus shown in Fig. 1.

Referring to the drawings, there is shown a bearing tester 10 for sensitive instrument bearings comprising a chassis 11, a framework 12 disposed on top of said chassis, and a test assembly 13 supported on the framework. The bearing tester, as shown, is a complete unit to which electric power is supplied by means of a cord 14, each of the parts 11, 12 and 13 housing certain components of the test apparatus, as will be made clear.

The framework 12 comprises a horizontal base member 15 and a vertical wall member 16 disposed at right angles to each other and rigidly held together by means of the bracing members 17 and 18. The parts 15 and 16 may be formed of any suitable material, such as metal, for example, of proper gauge. Disposed on the forward side of vertical member 16 are two housings 19 and 21 which are adapted to contain, respectively, the iron core and coil combinations 23, 24 and 25, 26 (Fig. 5) forming part of the motor means for driving a bearing under test.

The test assembly 13 includes a base member 27 and a framework 28 which are adapted to support a vertical spindle or shaft 29 by means of suitable bearings. In Figs. 1 and 4 there is a cover over the framework which is removed in Fig. 2. At the upper end of shaft 29 there is an adapter 31 which supports the inner race of a bearing 32 to be tested. Different diameters of adapters 31 are required for testing bearings of different size. A second adapter 33 is provided and includes a downwardly-projecting skirt portion 34 which is received around the outer race of the bearing to be tested. Projecting upwardly from adapter 33 is a reduced portion 35 which fits into a correspondingly-sized central opening in a disk 36 forming another part of the motor for driving the bearing to be tested. Various adapters may be provided, each having the proper inside diameter of skirt 34 for holding a bearing of particular size, the proper weight so as to place the desired vertical load on the bearing, and the proper diameter of the portion 35 so it may be received in the central opening of disk 36. The diameters of adapters 31 and 33 are such that the races of the bearing received thereby are relatively easily held, so that the bearing may be easily placed in position and removed therefrom. Yet, at the same time, the diameters of the adapters are such that the races of the bearings are held without slipping so that the proper relative motion of the bearing races is obtained during test operations.

In Figs. 2 and 5 the relative positions of adapter 31, bearing 32, adapter 33, and disk 36 may be seen, and in Figs. 1 and 4 the assembled position of these members may be seen. The height of shaft 29 in test assembly 13 is such that when the adapters 31 and 33, the bearing 32, and the disk 36 are in position, and the test assembly 13 is disposed upon the horizontal base member 15, the disk 36 is at a height to be received within the slots 37 and 38 in housings 19 and 21, respectively. The slots 37 and 38 correspond in position to air gaps 39 and 41 in the iron cores 23 and 25, respectively.

Locating means for the test assembly 13 are preferably also disposed on the horizontal base 15 and may comprise a pair of blocks 42 and 43 having angularly disposed surfaces 44 and 45 facing each other. The disposition of these blocks and of the surfaces 44 and 45 is such that when the base 27 of the test assembly 13 is received therebetween so as to engage the surfaces 44 and 45, as may be seen best in Fig. 1, the disk 36 is properly received within the slots 37 and 38 and the apparatus is in the proper position for testing the bearing 32. That is to say, the disk 36 is disposed at the proper height and is spaced away from the vertical member 16 and other adjacent surfaces in order to prevent contact therewith. The proper positioning of the testing apparatus is thus effected quickly, easily and accurately.

The disk 36 and the core and coil combinations 23, 24 and 25, 26 form an eddy current motor for driving the bearing to be tested. Alternating-current voltage is supplied to the windings 24 and 26 and the disk 36 may be made of aluminum, as is well understood.

Referring to Figs. 3 and 4, there is shown attached to the rear side of chassis 11 a motor 46, the motor being supported by means of rods 47 attached to an angle bracket 48 which is attached to the rear of the chassis. By mounting the motor 46 on the chassis 11, vibrations caused by the motor are not transmitted to the framework 12. To further facilitate this, the rods 47 may be attached to the motor 46 by means of a rubber mounting 49. Mounted on the upper end of the shaft of motor 46 is a disk 51 which has such a diameter that the periphery thereof projects through an appropriately provided slit in the vertical member 16 and may overlie very slightly the periphery of disk 36 when this disk is in the testing position.

The motor 46 is a standard-speed synchronous motor, such for example as an electric-clock motor. Consequently the disk 51 is driven at a predetermined speed.

The top surface of disk 51 may be provided with a series of uniformly spaced dots 52. Correspondingly, the upper surface of the disk 36 may be provided with a series of uniformly spaced dots 53, the peripheral spacing of the dots 52 and 53 being the same. Consequently, when an operator observes the motions of the disks 51 and 36 and adjusts the apparatus so that the dots 52 and 53 move at the same peripheral speed, he knows that the disk 36, and consequently the bearing to be tested, 32, is being rotated at the desired speed if the rotational speed of disk 51 has previously been correctly selected. The rotational speeds of the disks, of course, are in inverse proportion to their radii when the peripheral speeds are the same. It is easy to observe when the disks are moving at the same peripheral speeds, since it is easy to determine when there are no differences in relative speeds of the dots when they come into conjunction with each other. The dots 52 and 53 may be indentations, protuberances, spots of paint or the like, teeth or serrations on the circumferences of the disks, or other viewable characterizations, without departing from the spirit and scope of the invention, and of course any other suitable speed indicating means, such as an electric tachometer, photoelectric counter, stroboscopic system or means for rotating a spot or beam of light on the disk 36, may be utilized if desired.

The frame 12 is supported on the chassis 11 by means of shock-mounts 54 in order to prevent the transmission of vibrations from the chassis 11 to the frame 12.

The shaft 29 is supported by the framework 28 of the test assembly 13 in two bearings 55 and 56 (see Fig. 5 where the framework 28 is represented schematically as a rectangle connecting the two bearings). Bearing 55 may be an antifriction bearing of the ballbearing type for example, and the bearing 56 may be a jewel member. Attached to the shaft 29 is an arm or lever 57 which bears against a second arm 58. The arm 58 is attached to the chuck of a pickup 59 by means of a screw 61. The pickup 59 may be of the character used as a pickup device in reproducing phonograph records. The pickup device 59 may be of the piezoelectric type (the piezoelectric element being shown by dotted lines inside of pickup 59 in Fig. 5), or it may be of any type wherein an electric effect is produced which corresponds to changes or rates of change of displacement. The arm 58 may be attached to the pickup 59 in the same manner that a phonograph needle is attached to its pickup. The pickup device, through its arm 58, resists rotation of the lever 57, and consequently the shaft 29 is held from rotation. The torque exerted by shaft 29 is exerted as a force by lever 57 against the piezoelectric element of the pickup, which consequently produces an electrical output proportional to the force exerted.

The remaining structure and the operation of the device may best be understood by considering Figs. 1 to 4 in connection with the circuit diagram of Fig. 5.

Assume that a bearing 32 to be tested is mounted on an adapter 31 of proper size which is mounted on the upper end of shaft 29. The second adapter 33 of proper weight and size is placed over the outer race of bearing 32 and the disk 36 is placed over the adapter member 35. Thereupon the test assembly 13 sitting on base 15 is slid into position between the surfaces 44 and 45 of members 42 and 43. Previously a switch 62 has been closed in order to supply electrical energy to the various parts of the apparatus, for example, to motor 46 by means of conductor 63 for driving the speed control disk 51, to the amplifier 64 by means of conductor 65 in order that the amplifier tubes may have warmed up and to the potentiometer or resistor 66 which controls the speed of bearing rotation. The switch 71 has been moved to the position shown in solid lines for counterclockwise rotation of disk 36. The torque control knob 72 which is connected to the contact arm 73 so as to move this member along resistor 66 has been moved to position the contact arm at the lower end of resistor 66 thereby supplying insufficient power to initiate rotation of the disk 36 and bearing 32.

The first test to be described is that of measuring starting torque or friction. With the various switches placed as described, the torque control knob 72 is turned so as to move the contact arm 73 upwardly along resistor 66. Energization is thus supplied to the winding 26 through the circuit extending from contact arm 73 through conductor 74, switch 71, and conductor 75. The meter 68 which may be a voltmeter is connected to contact arm 73 by means of conductor 76. As the contact arm 73 is moved upwardly along resistor 66, the meter 68 registers increasing voltage or whatever units in which the instrument is calibrated, for example gram-centimeters. The contact arm 73 is moved until the disk 36 just begins to rotate. At this point the reading of the meter 68 is noted and it represents the starting torque or friction of the bearing for the counterclockwise direction of rotation. The switch 71 is now moved to the position shown in dotted lines, for clockwise rotation of disk 36, and the torque control knob 72 is moved to its initial position. Energization is supplied to winding 24 through the circuit extending from contact arm 73 through conductor 74, switch 71 and conductor 77. The torque control knob 72 is turned so as to move the contact arm 73 along resistor 66 until the disk 36 begins to rotate, whereupon the reading of meter 68 is taken. This indicates the starting torque or friction for the clockwise direction of rotation.

The second test to be described is that of running torque or friction. During the starting torque tests the disk 51 has been rotating at its predetermined synchronous speed since the motor 46 has been energized. With the disk 36 rotating, the torque control knob 72 is adjusted until the dots 52 and 53 move precisely together as they pass their point of overlapping. The diameters of the disks have previously been chosen, so that with the predetermined speed of motor 46, the disk 36 and consequently the bearing 32 now rotate at the desired speed, for example eight revolutions per minute. The reading of meter 68 is taken in this instance for both clockwise and counter-clockwise rotation and indicates the normal or running torque of the bearing. The meter 68 does not provide any indication of instantaneous or transient torques which the bearing may experience, these being indicated by the apparatus associated with the dynamic pickup 59.

The third test to be made is that of instantaneous peak torque or friction, i. e. transient torque or friction, such as may be caused by foreign matter or roughness in the bearing races, or other defects. This test is made by running the bearing at predetermined speed, which may be an arbitrary one found to be satisfactory, for example, eight revolutions per minute, and observing the instrument 69.

Assuming that the disk 36 is running counter-clockwise, the lever 57 will be exerting a counter-clockwise torque against the arm 58. The arm 58 deflects and causes pickup 59 to produce a voltage proportional to the deflection. This voltage appears across resistor 82 and a percentage thereof is supplied by contact arm 79 to the amplifier 64 and thence to meter 69. The position of contact arm along resistor 82 thus determines the range of scale over which the pointer of instrument 69 will deflect for a particular defect. The calibrating knob 78, which is connected to the contact arm 79 for moving it along resistor 82, has been set, for this test, to a point which has previously been determined for a particular bearing in order to have the instrument 69 operate the proper range. The instrument 69 is essentially a volt meter and is provided with a red scale portion 81. If the instrument pointer moves into the red scale portion, the bearing is defective. The calibrating knob 78, and consequently the contact arm 79 on resistor 82, is so set that the pointer of instrument 69 is adjacent the lower end of its scale for normal conditions of the particular bearing.

If the bearing has no rough spots on the races or foreign matter therein, and is otherwise normal, the torque will remain steady and at a low value, as indicated by the instrument. However, if foreign matter or other defects are present, sudden and rapid changes in torque or friction will occur when the balls of the bearings strike these spots. These sudden changes in torque are noted by the pickup 59, are amplified by amplifier 64, and produce sudden swings of the pointer of instrument 69. The amplitude of the swing of the instrument pointer is, of course, proportional to the amplitude of the bearing defect. The instrument 69 is in effect a "go" and "no go" gauge, since if the pointer does not swing into the red portion of the instrument, the bearing is satisfactory.

The presence of dirt or foreign matter in the bearing can usually be detected by the changing character of the pointer swings, the rate and amplitude thereof being very irregular. If this condition exists the bearing may be removed and cleaned, and retested. Rough spots and other defects of the races or balls cause the instantaneous changes in torque to occur very regularly, with consequent regular swings of the instrument pointer. If the bearing checks clean and smooth but has a high running torque, it usually needs only lubrication.

The instantaneous changes in torque for the bearing may also be tested for the clockwise rotation of the bearing. Deflection of the arm 58 in the opposite direction causes the pickup 59 to produce a proportional output and the remaining apparatus operates as already described.

A pair of headphones 80 may be provided and connected to the output of the amplifier (Fig. 5) for listening to the sound of the bearing. A jack 90 may be provided in the chassis for receiving the corresponding plug to which the headphones are connected.

The chassis has various components placed thereon exteriorly as shown and is adapted to have the amplifier 64, and other components, disposed inside thereof. A complete and self-contained unit is thus had.

The tests described are all made with one setup of the test apparatus which is easily done. It requires placing the bearing on the shaft, placing the adapter and the disk on the bearing, and sliding the apparatus into proper position as determined by the members 44 and 45. Consequently the tests may be made easily, rapidly and efficiently.

In Fig. 6 is shown another form of apparatus for measuring the transient or instantaneous peak torque of the bearing. In this figure the vertical shaft 29, the bearings 55 and 56, frame 28 and adapter 31 may be the same as shown in Fig. 5. Attached to the frame 28 and to the shaft 29 are the hairsprings 83 and 84 which maintain the shaft in a normal position except when a torque is being exerted thereon. Carried by the shaft 29, so as to be movable therewith as a unit but insulated therefrom, are the armature coils 85 and 86. The coils 85 and 86 are connected in series with each other and to the ends of the hairsprings 83 and 84 which also are insulated from the shaft 29 by means of insulating collars 87 and 88.

Mounted upon the framework 28 is a second pair of coils 89 and 91. These coils are mounted to be at right angles to the coils 85 and 86 in so far as the directions of their magnetic fields are concerned when the shaft 29 is not deflected. In the right angular position there is no magnetic coupling between coils 89 and 91 and coils 85 and 86 and no voltage is induced into the coils 89 and 91 even though the coils 85 and 86 are energized from a source of A. C. voltage through a circuit as follows: From the source through conductor 92, hair spring 84, conductor 93, coils 86 and 85, conductor 94, hairspring 83 and conductor 95 back to the source. The connections shown between hairspring 84 and conductor 92, and hairspring 83 and conductor 95 on the framework 28, are connections insulated from the framework, as shown.

When the shaft 29 is rotated in either direction there will be a coupling between windings 85 and 86 and windings 89 and 91 which is proportional to the cosine of the angle between the windings. A voltage proportional to the cosine of the angle between windings, or proportional to the angle itself, for angles not far removed from 90°, will appear at the terminals 96 by means of conductors 97 and 98. This voltage of course may be amplified by the amplifier 64 and will produce an indication in meter 69 if the arrangement of Fig. 6 is used in place of the arrangement of Fig. 5.

Since the springs 83 and 84 may first have been calibrated, that is, the torque necessary to produce a given deflection determined, then the arrangement of Fig. 6 may be easily calibrated to produce an absolute indication of the torque changes occurring within the bearing tested.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Apparatus for testing antifriction bearings comprising, pivotal means for receiving and gripping the inner race of a bearing and for supporting the weight of such bearing, an adapter for receiving and gripping the outer race of such bearing, an eddy current motor including a disk having a central opening for receiving and gripping said adapter to rotate said outer race, means for restraining rotative movement of said pivotal means but permitting deflections thereof, and electrical means coupled to said restraining means for detecting instantaneous changes in such deflections.

2. Apparatus for testing antifriction bearings comprising, pivotal means for receiving and gripping the inner race of a bearing and for supporting the weight of such bearing, second means for receiving and gripping the outer race of such bearing, electrical means for rotating said second means, and means including piezoelectric means coupled to said pivotal means for restraining rotative movement of said pivotal means but permitting deflections thereof and detecting instantaneous changes in such deflections.

3. Apparatus for testing antifriction bearings comprising, pivotal means for receiving and gripping the inner race of a bearing and for supporting the weight of such bearing, second means for receiving and gripping the outer race of such bearing, electrical means for rotating said second means, means for restraining rotative movement of said pivotal means but permitting deflections thereof, and transformer means including relatively movable windings, one of which is attached to and movable with said pivotal means and the other of which is stationary for detecting instantaneous changes in such deflections.

4. Apparatus for testing antifriction bearings comprising, pivotal means for receiving and gripping the inner race of a bearing and for supporting the weight of such bearing, second means for receiving and gripping the outer race of such bearing, electrical means for rotating said second means, hairspring means for restraining rotative movement of said pivotal means but permitting deflections thereof, and transformer means including relatively movable windings one of which is attached to and movable with said pivotal means and the other of which is stationary for detecting instantaneous changes in such deflections.

5. Apparatus for testing antifriction bearings comprising, a framework including a horizontal base and a vertical wall, a test assembly including a base, a vertical shaft pivotally mounted on said base and upon which a bearing to be tested may be mounted and a driving disk to be mounted on such bearing, and means including a gap mounted on said wall for driving said disk, said test assembly being movable on said horizontal base whereby said disk when mounted on a bearing which is mounted on said shaft may be moved into said gap to arrange the apparatus for testing such bearing and may be removed from said gap for enabling a bearing to be placed on and removed from said vertical shaft.

6. Apparatus for testing antifriction bearings comprising, a framework including a horizontal base and a vertical wall, a test assembly including a base, a vertical shaft pivotally mounted on said base and upon which a bearing to be tested may be mounted and a driving disk to be mounted on such bearing, and a pair of means mounted in spaced-apart relation on said wall, one of which is adapted for driving said disk in one direction and the other of which is adapted for driving said disk in the reverse direction, each of said means including a gap, said test assembly being movable on said base whereby said disk when mounted on a bearing which is mounted on said shaft may be moved into both of said gaps to arrange the apparatus for testing such bearing in either direction of rotation and may be removed from both of said gaps for enabling such bearing to be placed on and removed from said vertical shaft.

7. Apparatus for testing antifriction bearings comprising, a framework including a horizontal base and a vertical wall, a test assembly including a base, a vertical shaft pivotally mounted on said base and upon which a bearing to be tested may be mounted and a driving disk to be mounted on such bearing, means mounted on said wall for driving said disk, said test assembly being movable on said horizontal base whereby a bearing may be placed on and removed from said vertical shaft, and guide means on said framework for positioning said assembly whereby said disk when mounted on a bearing which is mounted on said shaft is operatively positioned relative to said driving means.

8. Apparatus for testing antifriction bearings comprising, a framework including a horizontal base and a vertical wall, a test assembly including a base, a vertical shaft pivotally mounted on said base and upon which a bearing to be tested may be mounted and a driving disk to be mounted on such bearing, means including a gap mounted on said wall for driving said disk, said test assembly being movable on said horizontal base whereby said disk when mounted on a bearing which is mounted on said shaft may be moved into said gap to arrange the apparatus for testing such bearing and may be removed from said gap for enabling a bearing to be placed on and removed from said vertical shaft, and means on said framework for determining a predetermined position of said test assembly on said framework.

9. Apparatus for testing antifriction bearings comprising, a framework including a horizontal base and a vertical wall, a test assembly including a base, a vertical shaft pivotally mounted on said base and upon which a bearing to be tested may be mounted and a driving disk to be mounted on such bearing, a pair of means mounted in spaced-apart relation on said wall, one of which is adapted for driving said disk in one direction and the other of which is adapted for driving said disk in the reverse direction, each of said means including a gap, said test assembly being movable on said horizontal base whereby said disk when mounted on a bearing which is mounted on said shaft may be moved into both of said gaps to arrange the apparatus for testing such bearing in either direction of rotation and may be removed from both of said gaps for enabling such bearing to be placed on and removed from said vertical shaft, and means on said framework for locating said test assembly in a position where said disk is operatively positioned relative to both of said driving means.

10. Apparatus for testing antifriction bearings comprising, a framework including a horizontal base and a vertical wall, a test assembly including a base and a vertical shaft pivotally mounted on said base and upon which a bearing to be tested may be mounted, said assembly being movable with its base on said horizontal base, magnetic core means attached to said vertical wall, said core means including a gap whose plane is parallel to said horizontal base and perpendicular to said vertical wall, a conducting disk adapted to be mounted on the bearing to be tested, said shaft having a height whereby said disk is receivable in said gap when said disk is mounted on said bearing, and means on said framework for guiding said assembly into position whereby said disk when mounted on a bearing which is mounted on said shaft is received in said gap and is free of engagement with said vertical wall.

11. Apparatus for testing antifriction bearings comprising, a framework including a horizontal base and a vertical wall, a test assembly including a base, a vertical shaft pivotally mounted on said base and upon which a bearing to be tested may be mounted and a driving disk to be mounted on such bearing, means mounted on said wall for driving said disk, and means for indicating the speed of rotation of said disk when mounted on a bearing which is mounted on said shaft, said test assembly being movable on said horizontal base whereby a bearing to be tested may be placed on and removed from said vertical shaft.

12. Apparatus for testing antifriction bearings comprising, a chassis, a framework including a horizontal base and a vertical wall disposed on said chassis, shock-mount means between said chassis and said horizontal base, a test assembly including a base, a vertical shaft pivotally mounted on said base and upon which a bearing to be tested may be mounted and a driving disk to be mounted on such bearing, means mounted forwardly on said wall for driving said disk, means for indicating the speed of rotation of said disk when mounted on a bearing which is mounted on said shaft, said test assembly being movable on said horizontal base whereby a bearing may be placed on and removed from said vertical shaft, and means on said framework for positioning said assembly in test position.

13. Apparatus for testing antifriction bearings comprising, a framework including a horizontal base and a vertical wall, a test assembly including a base, a verical shaft pivotally mounted on said base and upon which a bearing to be tested may be mounted and a driving disk to be mounted on such bearing, said disk including a series of indicia uniformly spaced around its periphery, means mounted on said wall for driving said disk, and a second disk and a motor for driving it at predetermined speed mounted with respect to said wall whereby the periphery of said second disk when mounted on a bearing which is mounted on said shaft is disposed in close association with the periphery of said first disk when said test assembly is in test position, said second disk including a series of indicia uniformly spaced around its periphery by the same spacing as the indicia on said first disk, said test assembly being movable on said horizontal base whereby a bearing to be tested may be placed on and removed from said vertical shaft.

14. Apparatus for testing antifriction bearings comprising, a chassis, a framework including a horizontal base and a vertical wall disposed on said chassis, shock-mount means between said chassis and said horizontal base, a test assembly including a base, a vertical shaft pivotally mounted on said base and upon which a bearing to be tested may be mounted and a driving disk to be mounted on such bearing, said disk including a series of indicia uniformly spaced around its periphery, means mounted forwardly on said wall for driving said disk, a second disk and a motor for driving it at predetermined speed mounted on said chassis rearwardly of said wall, said wall including an opening through which said second disk protrudes, said assembly having dimensions whereby the periphery of said driving disk when mounted on a bearing which is mounted on said shaft is disposed in close association with the periphery of said second disk when said test assembly is in test position, said second disk including a series of indicia uniformly spaced around its periphery by the same spacing as the indicia on the said driving disk, said test assembly being movable on said horizontal base whereby a bearing may be placed on and removed from said vertical shaft, and means on said framework for positioning said assembly in test position.

References Cited in the file of this patent
UNITED STATES PATENTS

| | | |
|---|---|---|
| 1,316,820 | Tsuchiya et al. | Sept. 23, 1919 |
| 1,708,333 | Smith | Apr. 9, 1929 |
| 1,949,743 | Holmes | Mar. 6, 1934 |
| 2,091,022 | Stuart | Aug. 24, 1937 |
| 2,329,541 | Kuehni | Sept. 14, 1943 |
| 2,349,563 | Rouy | May 23, 1944 |
| 2,398,156 | Puterbaugh et al. | Apr. 9, 1946 |
| 2,422,806 | Silverman et al. | June 24, 1947 |
| 2,471,423 | Gisser | May 31, 1949 |
| 2,538,790 | Merrill | Jan. 23, 1951 |